US011425287B2

(12) United States Patent
Smith

(10) Patent No.: US 11,425,287 B2
(45) Date of Patent: Aug. 23, 2022

(54) APPARATUS FOR PROTECTING A CAMERA FROM FOREIGN DEBRIS CONTAMINATION

(71) Applicant: GM GLOBAL TECHNOLOGY OPERATIONS LLC, Detroit, MI (US)

(72) Inventor: Joel L. Smith, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 17/146,640

(22) Filed: Jan. 12, 2021

(65) Prior Publication Data
US 2022/0224811 A1    Jul. 14, 2022

(51) Int. Cl.
*H04N 5/225*    (2006.01)
(52) U.S. Cl.
CPC ....... *H04N 5/22521* (2018.08); *H04N 5/2252* (2013.01)
(58) Field of Classification Search
CPC ............ H04N 5/22521; H04N 5/2252; H04N 5/2251–2254; B60R 11/04; B60R 2011/004; B60S 1/56; B60S 1/54; B62D 37/02; G02B 27/0006; G03B 17/08
See application file for complete search history.

(56) References Cited

U.S. PATENT DOCUMENTS

| 6,793,416 | B2 | 9/2004 | Peterson et al. | |
|---|---|---|---|---|
| 9,707,896 | B2 | 7/2017 | Boegel et al. | |
| 2007/0206942 | A1* | 9/2007 | Gyde Heaven | G03B 17/02 348/E5.026 |
| 2013/0062228 | A1* | 3/2013 | Danilov | B08B 17/02 134/10 |
| 2018/0231875 | A1* | 8/2018 | Zanganeh | H04N 5/2252 |
| 2019/0037113 | A1* | 1/2019 | Irie | H04N 5/225 |

FOREIGN PATENT DOCUMENTS

WO    WO2017143966 A1    8/2017

* cited by examiner

Primary Examiner — Sinh Tran
Assistant Examiner — Zhenzhen Wu
(74) Attorney, Agent, or Firm — Vivacqua Crane PLLC

(57) ABSTRACT

An apparatus for protecting a camera from foreign debris incudes a first body and a second body removably coupled to the first body. The first body has a first inner surface and a first outer surface opposite the first inner surface. The first inner surface defines a first cavity. The first inner surface has an inner circumference. The first body includes a protrusion extending directly from the first inner surface toward the first cavity. The protrusion extending along an entirety of the inner circumference of the first inner surface and is shaped as a half-torus. The second body has a second inner surface and a second outer surface opposite the second inner surface. The second inner surface defines a second cavity. The second cavity is in fluid communication with the first cavity to facilitate flow of the fluid from the first cavity to the second cavity.

20 Claims, 3 Drawing Sheets

APPARATUS FOR PROTECTING A CAMERA FROM FOREIGN DEBRIS CONTAMINATION

TECHNICAL FIELD

The present disclosure generally relates to cameras and, more particularly, to an apparatus for protecting a camera from foreign debris contamination.

INTRODUCTION

The present disclosure describes an apparatus for protecting a camera lens from foreign debris in a harsh environment. The presently disclosed apparatus allows operation of the camera in a harsh environment, protects the camera from foreign debris contamination of the camera housing and lens, and reduces maintenance overhead for cleaning and maintaining the quality of captured images. In doing so, the presently disclosed apparatus uses air (or another suitable fluid) to create a protection boundary around the camera lens without affecting the image quality. The apparatus further includes an integrated serviceable bezel to simplify camera calibration. Further, the apparatus may be created using additive manufacturing, such as 3D printing, to create the complex surfaces.

Specifically, the apparatus uses airflow to produce an invisible protection boundary around the camera lens without affecting the image quality. Further, the apparatus uses a half-toroid protrusion and complex surfaces to form the invisible protection boundary around the camera lens. The integrated sealed service bezel allows camera adjustments, while preserving air boundary layer to protect the camera lens.

In an aspect of the present disclosure, the presently disclosed apparatus for protecting a camera from foreign debris includes a first body having a first inner surface and a first outer surface opposite the first inner surface. The first inner surface defines a first cavity sized to receive the camera. The first inner surface has an inner circumference. The first body includes a protrusion extending directly from the first inner surface toward the first cavity. The protrusion extends along an entirety of the inner circumference of the first inner surface and is shaped as a half-torus to facilitate laminar flow of a fluid along the inner surface encapsulating the camera in a protected fluid region/pocket. The apparatus further includes a second body removably coupled to the first body. The second body has a second inner surface and a second outer surface opposite the second inner surface. The second inner surface defines a second cavity. The second cavity is sized to receive the camera. The second cavity is in fluid communication with the first cavity to facilitate flow of the fluid from the first cavity to the second cavity, thereby protecting the camera from debris contamination.

The first body may be elongated along a longitudinal axis. The first body has a first end and a second end opposite the first end. The first end may be spaced apart from the second end along the longitudinal axis. The first body may have a camera opening at the first end, the camera opening is sized to receive the camera. The first body may have an end wall at the second end. The first body may have a fluid conduit opening extending through the end wall. The fluid conduit opening may be sized to receive a fluid conduit. The fluid conduit is configured to deliver a fluid into the first cavity and along the camera to minimize debris contamination. The first body may have a power line opening extending through the end wall, the power line opening is sized to receive a power line. The power line may be configured to supply electrical energy to the camera and for data communications. The protrusion may be closer to the second end than to the first end of the first body to promote laminar flow of the fluid delivered by the fluid conduit.

The apparatus may further include a mount extending through the first body. The mount may be partly disposed in the first cavity. The mount may be partly disposed outside the first cavity. The mount may be configured to support the camera, and the mount is in direct contact with the camera to secure the camera inside the first body. The extrusion for the camera mount does not necessarily have internal threads. The camera is attached via a through bolt to a threaded hole in the camera. The bolt is screwed into the camera binding the camera, and the apparatus attachment via bolt generated compression on the camera mount body. The camera mount hole may be viewed as a sleeve.

The first body may include a bezel seal at the first end to promote laminar flow of the fluid from the first cavity to the second cavity. The bezel seal may be tapered to promote laminar flow of the fluid from the first cavity to the second cavity. The bezel seal may be in direct contact with the second inner surface of the second body to promote laminar flow of the fluid from the first cavity of the second cavity.

The second body has a first terminus and a second terminus opposite the first terminus. The first terminus is spaced apart from the second terminus along the longitudinal axis. The internal threads may be closer to the first terminus than to the second terminus. The first body has a first outer diameter. The second body has a second outer diameter. The second outer diameter may be greater than the first outer diameter to maximize a field of view of the camera. The apparatus may further include an O-ring disposed between the external threads and the bezel seal to minimize fluid leakage. The O-ring may be in direct contact with bezel seal and the external threads to minimize fluid leakage.

The present disclosure also describes a system for protecting a camera lens from foreign debris. The system includes a camera including a camera body and a lens attached to the camera body. The system further includes a power supply electrically connected to the camera. The power supply is configured to supply electrical energy to the camera. The system further includes an apparatus configured to protect the camera from debris contamination as described above. The camera is disposed inside the apparatus. The system further includes a fluid source in fluid communication with the apparatus. Further, the system includes a fluid conduit fluidly coupling the apparatus to the fluid source. Additionally, the system includes a power line electrically connecting the power supply to the camera.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
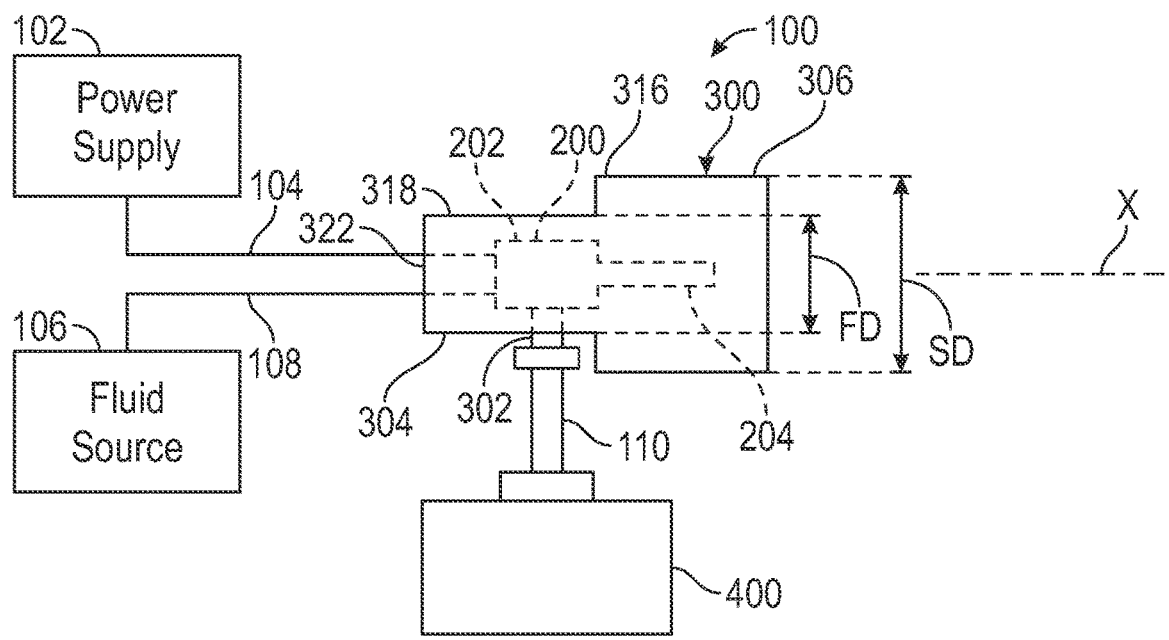
FIG. 1 is a schematic diagram of a system for protecting a camera from debris contamination.
Figure 2:
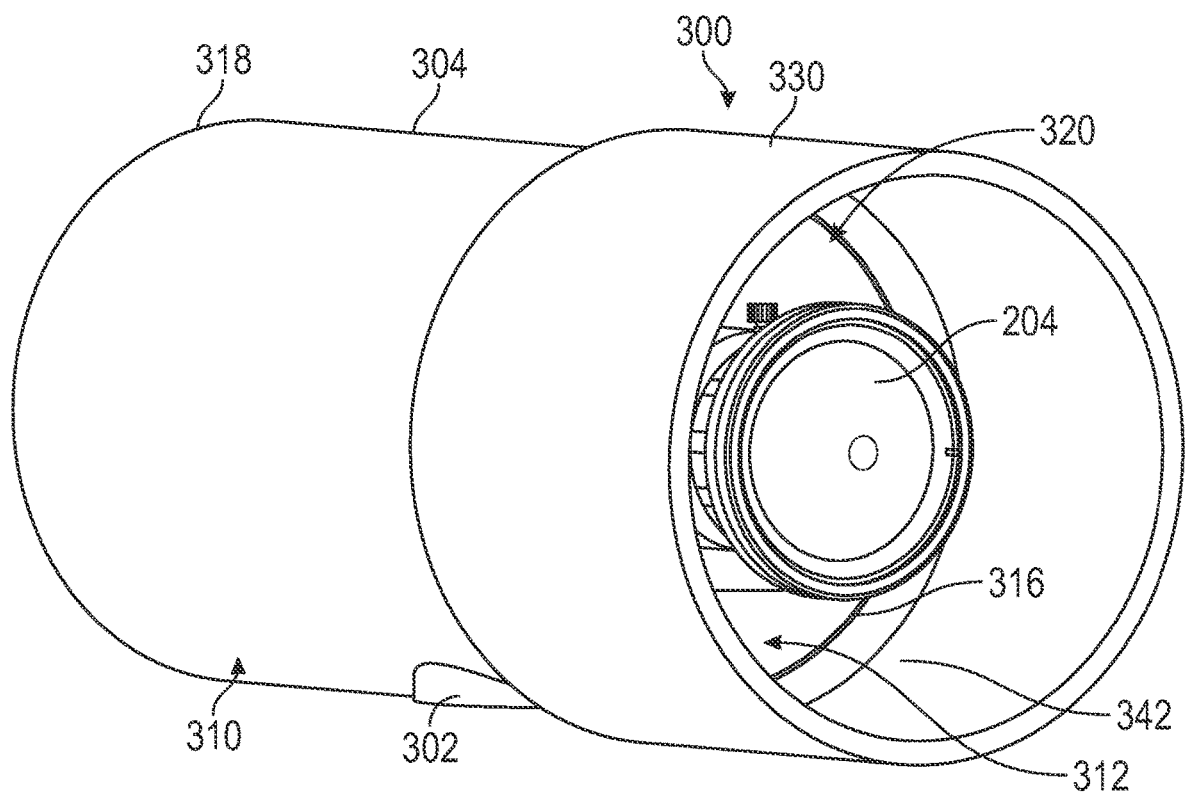
FIG. 2 is a schematic perspective view of an apparatus for protecting a camera from debris contamination, wherein the apparatus is part of the system shown in FIG. 1.
Figure 3:
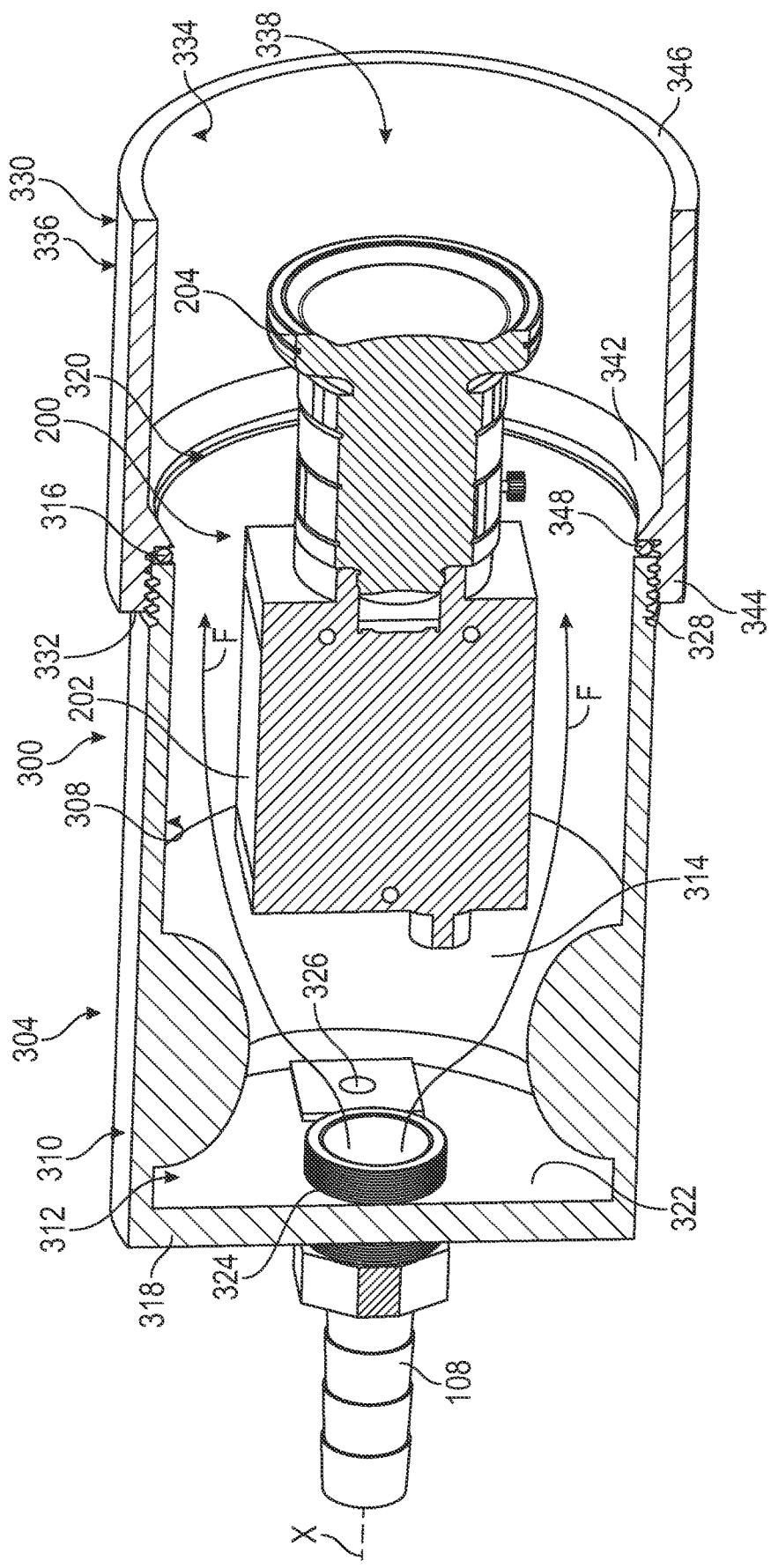
FIG. 3 is a schematic cross-sectional view of the apparatus of FIG. 2.
Figure 4:
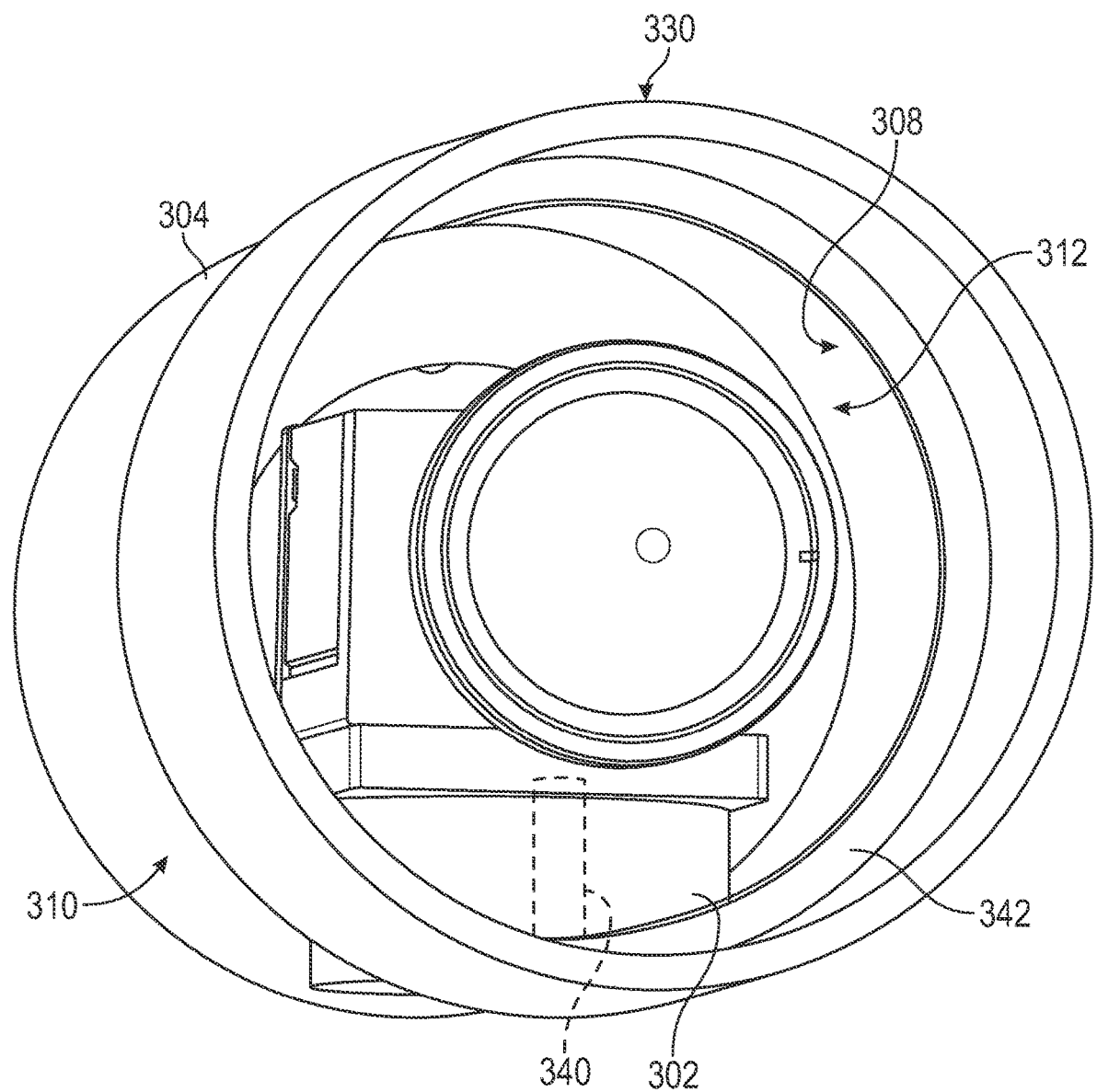
FIG. 4 is a schematic front view of the apparatus of FIG. 2.

FIG. 1 shows a system 100 for protecting a camera 200 from debris contamination. The system 100 includes the camera 200 and a power supply 102 electrically connected to the camera 200. The camera 200 includes a camera body 202 and a lens 204 attached to the camera body 202. The power supply 102 may be a battery, battery pack, or another device suitable to supply electrical energy to the camera 200. Regardless, the power supply 102 is configured to supply electrical energy to the camera 200. The system 100 further includes a power line 104 electrically connecting the power supply 102 to the camera 200. The power line 104 may be a power over ethernet (PoE) cable or other suitable line suitable to deliver electrical energy. The system 100 further includes an apparatus 300 configured to protect the camera from debris contamination. The camera 200 is disposed inside the apparatus 300 and, partly for this reason, the camera 200 is protected from debris contamination. The system 100 further includes a fluid source 106 in fluid communication with the apparatus 300. The fluid source 106 contains a fluid, such as air, capable of flowing through the apparatus 300 to protecting the camera 200 from debris contamination. The system 100 further includes a fluid conduit 108 fluidly coupling the apparatus 300 to the fluid source 106 and is configured to deliver fluid (e.g., air) from the fluid source 106 to the apparatus 300. The system 100 further includes an arm 110 coupled between the apparatus 300 and an infrastructure body 400, such as a wall. The arm 110 allows the apparatus 300 to be connected to the infrastructure body 400. The apparatus 300 may include a mount 302 to enhance the connection between the apparatus 300 and the arm 110. The apparatus 300 further includes a bolt 340 (FIG. 4) or another suitable fastener extending through the mount 302 and into the camera 200 to secure the camera 200 to the mount 302.

With reference to FIGS. 2-5, the apparatus 300 includes a first body 304 and a second body 330 removably connected to the first body 304. The first body 304 has a first inner surface 308 and a first outer surface 310 opposite the first inner surface 308. The first inner surface 308 defines a first cavity 312 sized to receive the camera 200. The first inner surface 308 has an inner circumference IC. The first body 304 includes a protrusion 314 extending directly from the first inner surface 308 toward the first cavity 312. The protrusion 314 extending along an entirety of the inner circumference IC of the first inner surface 308 and is shaped as a half-torus to facilitate laminar flow of a fluid F along the camera 200, thereby protecting the camera 200 from debris contamination. The protrusion 314 is closer to the second end 318 than to the first end 316 of the first body 304 to promote laminar flow of the fluid F delivered by the fluid conduit 108 and flowing into the first cavity 312.

The first body 304 is elongated along a longitudinal axis X (FIG. 1). The first body 304 has a first end 316 and a second end 318 opposite the first end 316. The first end 316 is spaced apart from the second end 318 along the longitudinal axis X. The first body 304 has a camera opening 320 at the first end 316. The camera opening 320 is sized to receive the camera 200. The first body 304 has an end wall 322 at the second end 318. The first body 304 has a fluid conduit opening 324 extending through the end wall 322. The fluid conduit opening 324 is sized to receive a fluid conduit 108. The fluid conduit 108 is configured to deliver the fluid F (e.g., air) into the first cavity 312 and along the camera 200 to minimize debris contamination of the camera 200. The first body 304 has a power line opening 326 extending through the end wall 322. The power line opening 326 is sized to receive the power line 104. The power line 104 is configured to supply electrical energy to the camera 200.

The apparatus 300 includes the mount 302, which extends through the first body 304. The mount 302 is partly disposed in the first cavity 312. The mount 302 is partly disposed outside the first cavity 312. The mount 302 is configured to support the camera 200. The mount 302 is in direct contact with the camera 200 to secure the camera 200 inside the first body 304.

The apparatus 300 further includes a second body 330 removably coupled to the first body 304. To service the camera 200, the second body 330 may be removed from the first body 304. The second body 330 has a second inner surface 334 and a second outer surface 336 opposite the second inner surface 334. The second inner surface 334 defines a second cavity 338. The second cavity 338 is sized to receive the camera 200. The second cavity 338 is in fluid communication with the first cavity 312 to facilitate flow of the fluid F from the first cavity 312 to the second cavity 338, thereby protecting the camera 200 from debris contamination.

The first body 304 has external threads 328 on the first outer surface 310. 'The second body 330 has internal threads 332 on the second inner surface 334. The external threads 328 are closer to the first end 316 than to the second end 318. The external threads 328 mate with the internal threads 332 to removably couple the first body 304 to the second body 330.

The first body 304 includes a bezel seal 342 at the first end 316 to promote laminar flow of the fluid F from the first cavity 312 to the second cavity 338. The bezel seal 342 is tapered to promote laminar flow of the fluid F from the first cavity 312 to the second cavity 338. The bezel seal 342 is in direct contact with the second inner surface 334 of the second body 330 to promote laminar flow of the fluid F from the first cavity 312 of the second cavity 338.

The second body 330 has a first terminus 344 and a second terminus 346 opposite the first terminus 344. The first terminus 344 is spaced apart from the second terminus 346 along the longitudinal axis X. The internal threads 332 are closer to the first terminus 344 than to the second terminus 346. The first body 304 has a first outer diameter FD (FIG. 1). The second body 330 has a second outer diameter SD (FIG. 1). The second outer diameter SD is greater than the first outer diameter FD to maximize a field of view of the camera 200. The apparatus 300 further includes an O-ring 348 disposed between the external threads 328 and the bezel seal 342 to minimize fluid leakage. The O-ring 348 is in direct contact with bezel seal 342 and the external threads 328 to minimize fluid leakage.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. An apparatus for protecting a camera from foreign debris, the apparatus comprising:
    a first body having a first inner surface and a first outer surface opposite the first inner surface, the first inner surface defines a first cavity sized to receive the camera, the first inner surface has an inner circumference, the first body includes a protrusion extending directly from the first inner surface toward the first cavity, the protrusion extending along an entirety of the inner circumference of the first inner surface and is shaped as a half-torus to facilitate laminar flow of a fluid along the camera, thereby protecting the camera from debris contamination; and
    a second body removably coupled to the first body, the second body having a second inner surface and a second outer surface opposite the second inner surface, the second inner surface defines a second cavity, the second cavity is sized to receive the camera, and the second cavity is in fluid communication with the first cavity to facilitate flow of the fluid from the first cavity to the second cavity, thereby protecting the camera from debris contamination.

2. The apparatus of claim 1, wherein the first body is elongated along a longitudinal axis, the first body has a first end and a second end opposite the first end, the first end is spaced apart from the second end along the longitudinal axis, the first body has a camera opening at the first end, the camera opening is sized to receive the camera, the first body has an end wall at the second end, the first body has a fluid conduit opening extending through the end wall, the fluid conduit opening is sized to receive a fluid conduit, and the fluid conduit is configured to deliver a fluid into the first cavity and along the camera to minimize debris contamination.

3. The apparatus of claim 2, wherein the first body has a power line opening extending through the end wall, the power line opening is sized to receive a power line, and the power line is configured to supply electrical energy to the camera.

4. The apparatus of claim 3, wherein the protrusion is closer to the second end than to the first end of the first body to promote laminar flow of the fluid delivered by the fluid conduit.

5. The apparatus of claim 4, further comprising a mount extending through the first body, the mount is partly disposed in the first cavity, the mount is partly disposed outside the first cavity, the mount is configured to support the camera, and the mount is in direct contact with the camera to secure the camera inside the first body.

6. The apparatus of claim 5, wherein the first body has external threads on the first outer surface, the second body has internal threads on the second inner surface, the external threads are closer to the first end than to the second end, and the external threads mate with the internal threads to removably couple the first body to the second body.

7. The apparatus of claim 6, further comprising a bolt extending through the mount and into the camera to secure the camera to the mount.

8. The apparatus of claim 7, wherein the first body includes a bezel seal at the first end to promote laminar flow of the fluid from the first cavity to the second cavity, the bezel seal is tapered to promote laminar flow of the fluid from the first cavity to the second cavity, and the bezel seal is in direct contact with the second inner surface of the second body to promote laminar flow of the fluid from the first cavity to the second cavity.

9. The apparatus of claim 8, wherein the second body has a first terminus and a second terminus opposite the first terminus, the first terminus is spaced apart from the second terminus along the longitudinal axis, the internal threads are closer to the first terminus than to the second terminus, the first body has a first outer diameter, the second body has a second outer diameter, and the second outer diameter is greater than the first outer diameter to maximize a field of view of the camera.

10. The apparatus of claim 9, further comprising an O-ring disposed between the external threads and the bezel seal to minimize fluid leakage, and the O-ring is in direct contact with bezel seal and the external threads to minimize fluid leakage.

11. A system, comprising:
    a camera including a camera body and a lens attached to the camera body;
    a power supply electrically connected to the camera, the power supply being configured to supply electrical energy to the camera;
    an apparatus configured to protect the camera from debris contamination, the camera being disposed inside the apparatus, wherein the apparatus includes:
        a first body having a first inner surface and a first outer surface opposite the first inner surface, the first inner surface defines a first cavity sized to receive the camera, the first inner surface has an inner circumference, the first body includes a protrusion extending directly from the first inner surface toward the first cavity, the protrusion extending along an entirety of the inner circumference of the first inner surface and is shaped as a half-torus to facilitate laminar flow of a fluid along the camera, thereby protecting the camera from debris contamination; and a second body removably coupled to the first body, the second body having a second inner surface and a second outer surface opposite the second inner surface, the second inner surface defines a second cavity, the second cavity is sized to partially receive the camera, the second cavity is in fluid communication with the first cavity to facilitate flow of the fluid from the first cavity to the second cavity, thereby protecting the camera from debris contamination;

a fluid source in fluid communication with the apparatus;

a fluid conduit fluidly coupling the apparatus to the fluid source; and a power line electrically connecting the power supply to the camera.

12. The system of claim 11, wherein the first body is elongated along a longitudinal axis, the first body has a first end and a second end opposite the first end, the first end is spaced apart from the second end along the longitudinal axis, the first body has a camera opening at the first end, the camera opening is sized to receive the camera, the first body has an end wall at the second end, the first body has a fluid conduit opening extending through the end wall, the fluid conduit opening is sized to receive the fluid conduit, and the fluid conduit is configured to deliver the fluid into the first cavity and along the camera to minimize debris contamination.

13. The system of claim 12, wherein the power line opening extending through the end wall, the power line opening is sized to receive the power line, and the power line is configured to supply electrical energy to the camera.

14. The system of claim 13, wherein the protrusion is closer to the second end than to the first end of the first body to promote laminar flow of the fluid delivered by the fluid conduit.

15. The system of claim 14, further comprising a mount extending through the first body, the mount is partly disposed in the first cavity, the mount is partly disposed outside the first cavity, the mount is configured to support the camera, and the mount is in direct contact with the camera to secure the camera inside the first body.

16. The system of claim 15, wherein the first body has external threads on the first outer surface, the second body has internal threads on the second inner surface, the external threads are closer to the first end than to the second end, and the external threads mate with the internal threads to removably couple the first body to the second body.

17. The system of claim 16, further comprising a bolt extending through the mount and into the camera to secure the camera to the mount.

18. The system of claim 17, wherein the first body includes a bezel seal at the first end to promote laminar flow of the fluid from the first cavity to the second cavity, the bezel seal is tapered to promote laminar flow of the fluid from the first cavity to the second cavity, and the bezel seal is in direct contact with the second inner surface of the second body to promote laminar flow of the fluid from the first cavity to the second cavity.

19. The system of claim 18, wherein the second body has a first terminus and a second terminus opposite the first terminus, the first terminus is spaced apart from the first terminus along the longitudinal axis, the internal threads are closer to the first terminus than to the second terminus, the first body has a first outer diameter, the second body has a second outer diameter, and the second outer diameter is greater than the first outer diameter to maximize a field of view of the camera.

20. The system of claim 19, further comprising an O-ring disposed between the external threads and the bezel seal to minimize fluid leakage, and the O-ring is in direct contact with bezel seal and the external threads to minimize fluid leakage.

* * * * *